United States Patent
Winkler

(10) Patent No.: US 11,321,548 B2
(45) Date of Patent: May 3, 2022

(54) DEVICE AND METHOD FOR CONTROLLING A MATERIAL FLOW AT A MATERIAL FLOW NOD POINT

(71) Applicant: SSI Schäfer Automation GmbH (AT), Graz (AT)

(72) Inventor: Max Winkler, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 232 days.

(21) Appl. No.: 16/614,651

(22) PCT Filed: May 18, 2018

(86) PCT No.: PCT/EP2018/063091
§ 371 (c)(1),
(2) Date: Nov. 18, 2019

(87) PCT Pub. No.: WO2018/211072
PCT Pub. Date: Nov. 22, 2018

(65) Prior Publication Data
US 2020/0074126 A1 Mar. 5, 2020

(30) Foreign Application Priority Data

May 18, 2017 (DE) .................... 10 2017 110 861.0

(51) Int. Cl.
*G06F 7/00* (2006.01)
*G06K 7/10* (2006.01)
(Continued)

(52) U.S. Cl.
CPC ....... *G06K 7/10445* (2013.01); *B65G 1/1373* (2013.01); *B65G 43/08* (2013.01);
(Continued)

(58) Field of Classification Search
CPC .......... G06K 7/10445; G06K 7/10861; B65G 1/1373; B65G 43/08; B65G 43/10; B65G 2203/0216; B65G 2203/041; G06Q 10/08
(Continued)

(56) References Cited

U.S. PATENT DOCUMENTS 5,708,470 A * 1/1998 Holford .................... H04N 7/18
348/143
2008/0144880 A1 6/2008 DeLuca
(Continued)

FOREIGN PATENT DOCUMENTS

DE         44 08 650 A1    9/1995
DE    10 2007 035272 A1    1/2009
(Continued)

OTHER PUBLICATIONS

Office Action dated Feb. 3, 2022 in corresponding European Application No. 18 726 438.7.

*Primary Examiner* — Yolanda R Cumbess
(74) *Attorney, Agent, or Firm* — Renner, Otto, Boisselle & Sklar, LLP

(57) ABSTRACT

It is discloses a device and method for controlling a material flow (18) in a storage and picking system (10) at a sensor-controlled node (12) of the material flow (18), where a decision on a future direction of material flow or on a velocity of the material flow (18) is to be taken, wherein at least an inlet section (28) of the node (12) is detected by a, preferably single, sensor (22), comprising the steps of: by means of the sensor (22) generating (S10) sensor data (46) representing the material flow (18) which is defined by one or more material-flow objects (36), approaching the node (12) in a downstream direction, in a field of vision (26) of the sensor (22), in particular in an inlet section (28) of the node (12); checking (S16) whether the sensor data (46)
(Continued)

includes for each of the approaching objects (36-1, 36-2) at least one associated object feature (40) allowing certain identification of the corresponding object (36); and, if the sensor data (46) includes for each of the objects (36-1, 36-2) the at least one associated feature (40) allowing the certain identification, controlling (S18) the material flow (18) at the node (12) based on the sensor data (46); or, if the sensor data (46) does not include for each of the approaching objects (36-1, 36-2) the at least one associated feature (40) allowing the certain identification (S16), controlling (S26) the material flow (18) at the node (12) at least for such of the objects (36-1, 36-2), the associated feature (40) of which is not included in the sensor data (46), based on an information fusion (S22) of the sensor data (46) with pre-generated additional data (50), which originates from at least one information source (52) which differs from the sensor (22) of the node (12), wherein the additional data (50) includes additional object features (40) which allow, together with the features (40) from the sensor data (46), a sufficiently certain identification (S24).

11 Claims, 4 Drawing Sheets

(51) Int. Cl.
  *B65G 1/137* (2006.01)
  *B65G 43/08* (2006.01)
  *B65G 43/10* (2006.01)

(52) U.S. Cl.
  CPC ......... *B65G 43/10* (2013.01); *G06K 7/10861* (2013.01); *B65G 2203/0216* (2013.01); *B65G 2203/041* (2013.01)

(58) Field of Classification Search
  USPC .................. 700/213, 223–226, 228, 230
  See application file for complete search history.

(56) References Cited

U.S. PATENT DOCUMENTS

| | | | |
|---|---|---|---|
| 2009/0212113 A1* | 8/2009 | Chiu | G06K 7/1443 235/462.41 |
| 2009/0321511 A1* | 12/2009 | Browne | G06Q 10/30 235/375 |
| 2010/0191367 A1 | 7/2010 | Grundmann et al. | |
| 2013/0118814 A1 | 5/2013 | Michael | |
| 2014/0180479 A1 | 6/2014 | Argue et al. | |
| 2015/0363625 A1 | 12/2015 | Wu et al. | |
| 2016/0104021 A1 | 4/2016 | Negro et al. | |
| 2017/0174439 A1* | 6/2017 | Ripley | B29B 17/02 |
| 2017/0312789 A1* | 11/2017 | Schroader | B65G 47/54 |

FOREIGN PATENT DOCUMENTS

| | | |
|---|---|---|
| DE | 10 2015 209963 A1 | 12/2015 |
| DE | 10 2015 219544 A1 | 4/2016 |
| DE | 10 2015 219660 A1 | 4/2017 |
| EP | 3 100 648 A1 | 12/2016 |
| NZ | 556253 A | 1/2010 |

* cited by examiner

STORAGE AND PICKING SYSTEM     10

- SOURCES / SINKS     70
  - WAREHOUSE     68
  - WORKSTATIONS     58
  - GOODS RECEIPT     56
  - ⋮

- NODES     12

- MATERIAL-FLOW CONTROL     38
  - MATERIAL-FLOW COMPUTER     60
  - SPS     62
  - SENSORS     22     (TRACKING / TRACING)
  - ⋮

- WAREHOUSE-MANAGEMENT CONTROL     54
  - WMC     64
  - OBJECT (DATA)     66
    - ▲ FEATURES     40
  - ⋮

- TRANSPORT SYSTEM     72
  - CONVEYER     14
  - SRD     74
  - DTS     76
  - ⋮

- ORDER MANAGEMENT     78

DEVICE AND METHOD FOR CONTROLLING A MATERIAL FLOW AT A MATERIAL FLOW NOD POINT

The present invention relates to a device, and a system, as well as a method for controlling a material flow in a storage and picking system at a sensor-controlled node of the material flow where the material flow divides downstream at an outlet side into at least two directions.

In general, the material flow is to be understood as a sequence of storage, transport and processing processes. So far for directing and guiding objects of the material flow, i.e. material-flow objects, through a (logistic) storage and picking system a very huge number of sensors (technically as simple as possible and as cheap as possible) is used, in particular light sensors, light barriers, and scanners. These sensors are used everywhere within an overall system, in particular at nodes (junctions, branches, unification points, etc.) of the material flow. Very often several sensors are used simultaneously at the nodes. It is a general aim to allow "tracking" and "tracking". Tracing and tracking are to be understood in (intra) logistics as an (internal) tracking of the material-flow objects.

It is an aim of tracking to allow determination and retrieval of the exact location of the object within the overall system at any time. Based on this information processes can be optimized, and unused capacities can be reduced by an exact planning of the material flow, warehouse occupancy, goods receipts, or the like. Tracking indicates the tracking of the object from source to sink. Tracing indicates back tracing from an end customer to the point of primary production.

Beside the simple and cheap sensors, such as the above-mentioned light sensors, light barriers, and scanners, also cameras are increasingly used nowadays for the purposes of intralogistics.

Material-flow control by means of a video camera is disclosed in DE 10 2006 015 689 A1. Status images of the cameras are evaluated for determining an actual position of the to-be-conveyed object in a predetermined region of the system. The video camera is arranged, for example, perpendicular above a conveyer. The status images are evaluated for determining an actual position of conveying goods (material-flow objects) which is then compared to a nominal position for generating corresponding control signals for the conveyer based on the nominal-actual comparison.

A video camera is used in DE 10 2011 055 455 A1 for determining the positions of objects within a transport container, wherein the transport container is transported on a conveyer. DE 10 2011 053 547 A1 discloses the use of video cameras for monitoring a process of transferring a conveying good by means of a robot positioned between two conveyers being arranged in parallel. In particular, identification labels and dimensions of the conveying goods are determined by means of the camera data. A similar system is disclosed in DE 10 2010 002 317 A1. Further, a filling state of a shaft of an order-picking machine is monitored by a video camera in DE 10 2010 001 569 A1. Thus, video cameras are already used for specific purposes in the field of intralogistics. However, in this context it is implicitly assumed that an identity of the object which is to be handled is certainly known.

DE 10 2007 035 272 A10 discloses a method of identifying transport goods, in particular pieces of luggage, by means of a plurality of sensors. Technological background can be found in the book "Materialfluss in Logistiksystemen" (6th edition, Berlin, Heidelberg, New York: Springer 2009, pages 329-339).

However, almost any solution exists for the problem of reducing the number of sensors required for the tracking and tracing within the overall system and being particularly used for a material-flow control within a storage and picking system.

Therefore, it is an object of the present invention to overcome the above-mentioned drawbacks by a corresponding device and a corresponding method.

This object is solved by a method for controlling a material flow in a storage and picking system at a sensor-controlled node of the material flow, where a decision on a future direction of material flow and/or on a velocity of the material flow is to be taken, wherein at least one inlet section of the node is detected by one, preferably single, sensor, comprising the steps of: by means of the sensor generating sensor data representing the material flow which is defined by one or more material-flow objects approaching the node in a downstream direction in a field of vision of the sensor, in particular in the inlet section of the node; checking whether the sensor data includes for each of the approaching objects at least one associated object feature allowing certain identification of the corresponding object; and, if the sensor data includes for each of the objects the at least one associated feature allowing the certain identification, controlling the material flow at the node based on the sensor data; or, if the sensor data does not include for each of the approaching objects the at least one associated feature allowing the certain identification, controlling the material flow at the node at least for such of the objects, the associated feature of which is not included in the sensor data, based on an information fusion of the sensor data with pre-generated additional data which originates from at least one information source which differs from the sensor of the node, wherein the additional data includes additional object features which allow, together with the features from the sensor data, a sufficiently certain identification.

One advantage of the present invention, i.e. the influence on the material flow at the node, is preferably achieved by one single sensor technology, namely, for example, by means of the (video) camera. The camera replaces a plurality of sensors (e.g., light sensors, light barriers, etc.) typically used. Another advantage is to be seen in that, for example, stopping positions, outfeed positions, redirecting positions; acceleration positions and the like are detectable and influenceable independently of the sensor position based on the (great) field of view, or field of vision, of the camera. Here controlling the material flow by cameras per se is not concerned but overcoming a huge disadvantage of the camera which is to be seen in that the camera either cannot see the object-identifying features or cannot sufficiently resolve the same. This disadvantage is overcome by the information fusion in that the different information sources are combined and evaluated as well as combined for solving the specific problem.

The invention allows tracking of an object within the storage and picking system based on a minimal number of sensors. Cheap and technologically simple sensors, in particular cheap (video) camera systems, can be used, the restricted field of use thereof being compensated by the information fusion.

With a preferred embodiment the sensor is a camera, wherein the at least one feature is optically recognizable, and wherein the at least one feature preferably is a bar code, an individualizing color combination, an individualizing manufacturer label, an individualizing contour, and/or an individualizing dimension or size.

These features can be extracted and recognized from the sensor data by means of conventional image processing. In this context the image processing can draw on known image and pattern-recognition methods.

Further, it is preferred to select the field of vision of the camera that large that visible bar codes cannot be resolved.

The field of vision is then very large, wherein many of the objects and even many of the nodes including the objects located there are monitored simultaneously by one single sensor. The number of the sensors which is required in the overall system is further reduced. The resolution of the cameras steps into the background, whereby the price gets cheaper. The lacking resolution is compensated by the information fusion. The cameras are preferably used for determining position and/or orientation of the approaching objects.

In particular, the at least one information source includes a material-flow control, a warehouse-management control, a workstation, and/or a goods receipt.

These are classic information sources which exist anyway in conventional storage and picking systems.

Further it is preferred that the additional data for each of the approaching objects includes at least one of the following parameters: a sequence in which the objects approach the node; a relative distance of subsequent objects; and a time when the respective object has been added to the material flow; a deposition location where the respective object has been added to the material flow; a path which has been covered through the system by the respective object so far; a location-dependent velocity at which the respective object is moved through the system; a dimension of the respective object; a color combination of the respective object; a manufacturer label of the respective object; and a picking order to which the respective object belongs.

These parameters represent information which is already present in most of the cases in the storage and picking system anyway.

Further, it is advantageous to define an additional information sources by a light barrier, a light sensor, a (bar code/RFID/NFC) scanner, and/or a scale.

Such sensors are already present in conventional storage and picking systems and will be used even in the future at least at neuralgic material-flow nodes.

Another advantage is to be seen in that the controlling of the material flow includes actuating an actuator at the node.

In this case it is possible that the respective object changes its moving state, in particular its direction and/or its velocity, at the node in a desired manner.

Further it is optionally suggested that the step of checking includes: recognizing each of the approaching objects from the sensor data; extracting associated features for each of the recognized objects; and for each of the recognized objects determining whether the extracted associated features allow the certain identification.

In particular, the information fusion includes a data fusion of the sensor data with the additional data by merging and completing a corresponding incomplete sensor data set, which does not include the associated feature required for the certain identification, with the additional data, wherein the additional data set includes a variable, in particular one of the features, being present in both the sensor data set and also in the additional data set.

The method further comprises the optional step of: checking whether the merged and completed sensor data set includes one of the features which includes the sufficiently certain identification.

In particular, the sufficiently certain identification can be defined by a variable threshold for the degree of the identification. This degree can be, for example, 60%, 70%, 80%, or 90% of a (100%) certain identification wherein the identification is unambiguous and even bijective.

Further the object is solved by a device for controlling a material flow in a storage and picking system at a sensor-controlled node of the material flow where a decision on the future direction of the material flow or on a velocity of the material flow is to be taken, wherein the device comprises: a, preferably single, sensor, preferably a camera, comprising a field of vision, wherein the sensor is positioned such that the field of vision detects at least an inlet section of the node where one or more material-flow objects simultaneously approach the node in a downstream direction, wherein the sensor generates corresponding sensor data; at least one information source for an information fusion of the sensor data with pre-generated additional data which originates from the at least one information source, wherein the at least one information source differs from the sensor at the node; and an evaluation device being configured to: check whether the sensor data for each of the approaching objects includes at least one associated object feature which allows certain identification of the corresponding object; and, if the sensor data for each of the objects includes the at least one feature, outputting a signal for controlling the material flow at the node based on the sensor data; or, if the sensor data does not include for each of the approaching objects the at least one feature, outputting a signal for controlling the material flow at the node at least for such of the objects, an associated feature of which is not included in the sensor data, based on an information fusion of the sensor data with additional data originating from the at least one information source, wherein the additional data includes additional object features which allow, together with the features from the sensor data, a sufficiently certain identification; and conduct the information fusion.

It is clear that the above-mentioned and hereinafter still to be explained features cannot be used in the respectively given combination only but even in other combinations or alone without departing from the scope of the present invention.

Embodiments of the invention are illustrated in the drawings and will be explained in more detail in the following description.

FIG. 2 shows a block diagram of a storage and picking system;

Figure 1:
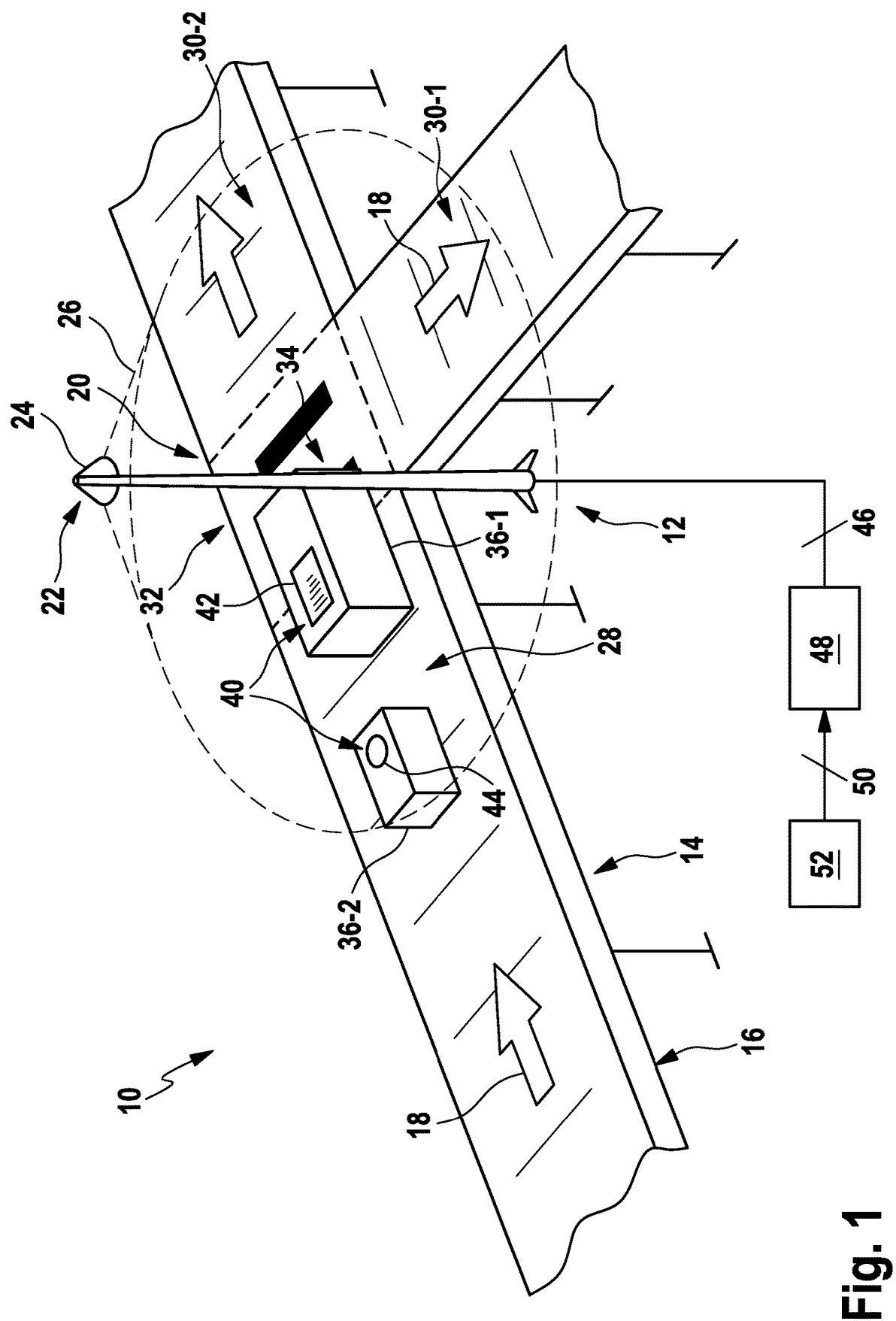
FIG. 1 shows a perspective view of a node of a material flow in a partially illustrated storage and picking system.

FIG. 1 shows a perspective view of an exemplary (material-flow) node 12 in a storage and picking system 10 which in turn is depicted in a sectional manner only. The node 12 is implemented, for example, by a conveyer 14 (e.g., roller conveyer 16, belt conveyer, or the like). In FIG. 1 a roller conveyer 16 is shown on pedestals which are not shown in more detail. Material flow 18 is indicated by light arrows on the roller conveyer 16. The node 12 is formed as a branching point 20 which is exemplarily T-shaped (in the top view).

One, preferably single, sensor 22 for monitoring the material flow 18 is arranged (e.g., stationary) at the node 12. The sensor 22 is implemented preferably by a (video) camera 24 comprising a field of view, or field of vision, 26 which is indicated in FIG. 1 by means of a dashed line and comprises an extension which is preferably conically shaped, wherein the camera 24 is the origin. The field of vision 26 preferably covers a relative huge section including the node 12, for example, centrally. The field of vision 26 can be dimensioned such that an inlet section 28 (including a conveyer inlet element), both of the outlet sections 30 (including the corresponding conveyer outlet elements), as well as a centrally arranged junction section 32 adjacent to the inlet and outlet sections 28 and 30 are certainly detected by the camera 24. In particular, the movements of material-flow objects 36 is detected which approach the junction section 32 (from left to right in FIG. 1).

In the junction section 32, for example, a lifting device 34 in terms of a double-track strap conveyer is provided which is not designated in more detail here. The tracks, or straps, of the strap conveyer are arranged in interstices of (here not shown and designated in more detail) rollers of the roller conveyer 16. The lifting device 34 is formed liftable and lowerable relative to the roller conveyer 16. The straps of the lifting device 34 are orientated such that the material-flow objects 36 can be discharged perpendicular to the original conveying direction. For this purpose, the straps which are located deeper before are lifted between the rollers so that objects 36 which are located on the straps are lifted from the rollers.

Instead of the lifting device 34 also other actuators can be provided alternatively (or additionally). Other exemplary actuators are: aligning devices, pushing devices, labeling devices, elevators, or the like.

In FIG. 1 exemplarily two objects 36-1 and 36-2 are shown in the region of the node 12. Also, more or less objects 36 can approach the node 12. The objects 36-1 and 36-2 are conveyed in a distanced to each other manner but can also be conveyed together without any distance (as a group). Here, the objects 36 are exemplarily shown as cuboidal cases which are transported in the present case as conveying goods without load carriers (e.g., trays, containers, pallets, or the like) via the roller conveyer 16. It is clear that the objects 36 can be realized by any arbitrary type of goods (e.g., picking goods, piece goods, cases, etc.) which are handled in the storage and picking system 10. The objects 36 can also be realized by (conveying) goods including a load carrier (not shown).

It is an important function of the sensor 22 to detect the material flow 18 in the region of the node 12 for supplying information on the objects 36-1 and 36-2 to a material-flow control 38 (cf. FIG. 2), which is not shown here, for directing the objects 36 into a respectively desired direction (e.g., to the outlet section 30-1). In the example of FIG. 1 the material flow 18 includes both objects 36-1 and 36-2 moving towards the node 12. The material flow 16 can include, amongst other things, information on the objects 36 such as a current position and velocity thereof on the roller conveyer. However, the identity of the objects 36-1 and 36-2 is of particular interest.

For controlling the objects 36-1 and 36-2 correctly at the node 12, i.e. to affect the same correctly in terms of material flow (e.g., move to a desired destination location), the objects 36 should be identified unambiguously, in particular bijectively, at the latest within the junction section 32. This identification happens in a computer-assisted manner in real time, in particular while the objects 36 are conveyed (continuously) into the junction section 32.

The identification of the objects 36 happens generally based on features 40 such as bar codes 42, manufacturer labels (e.g., logos) 44, or the like which will be described hereinafter in more detail and which are optically detected, evaluated and recognized by the sensor 22, or the camera 24, in the inlet section 28 of the node 12. Corresponding sensor data 46 are transmitted in terms of a signal from the sensor 22 to an evaluation device 48. Also, the corresponding signal transmission, or data transmission, can happen wirelessly.

The evaluation device 48 evaluates the sensor data 46 by checking whether one or more features 40 are present for each of the detected objects 36 allowing a certain identification of the respective objects 36. The evaluation device can be configured to analyze the sensor data 46 for the features 46, as will be explained in more detail hereinafter. This analysis (extraction) of the features 40, however, can also be conducted by a different entity (not illustrated). The evaluation device 48 is further configured to conduct an assessment of the features 40 (if present at all) from the sensor data 46 to determine whether the certain identification for each of the objects 36-1 and 36-2 is possible at all.

There are different degrees of the "certain identification". The bar code 42 generally allows a hundred percent certain identification of the objects 36 provided that the bar code 42 was visible and resolvable for the camera 24. The manufacturer label 44 (e.g., an enterprise-specific logo) does not always result in a one hundred percent certain identification. For example, it is possible that several objects 36, which are different with regard to a type of object, from the same manufacturer are present within the storage and picking system 10 so that a certain, in particular an unambiguous or even bijective, identification of the manufacturer label 44 is not yet sufficient for certainly (100%) identifying the respective type of the object 36.

In this (insufficient) case a "sufficiently certain" identification happens based on an information fusion as will be explained hereinafter in more detail.

With an information fusion additional data 50 are used for the evaluation, or assessment, by the evaluation device 50 in addition to the sensor data 46, i.e. in particular additionally to the features 40 extracted therefrom, wherein the additional data 50 originate from at least one information source 52 different to the sensor 22 of the node 12. The additional data 50 have been pre-generated, in particular upstream relative to the sensor 22, and include e.g., beside the manufacturer label 44 additional object features 40 which allow, together with the feature(s) 40 from the sensor data 46, the sufficiently certain identification of each of the objects 36-1 and 36-2. The sufficiently certain identification does not necessarily need to be a hundred percent certain identification. Thresholds for the degree of the identification can be defined (such as 60%, 70%, 90%, or the like) for causing the evaluation device 48 to take a decision into which of the outlet sections 30-1 and 30-2 the corresponding object 36 is to be directed.

In general, it is possible that the evaluation device 48 can conduct a certain identification for the object 36-1, but not for the other object 36-2. In this case the object 36-1 can be controlled, regarding material flow, with or without an information fusion. The object 36-2 in turn is controlled, regarding material flow, in any case by means of an information fusion (based on the sensor data 46 and the additional data 50). The evaluation device 48 takes a corresponding decision for each of the objects 36-1 and 36-2 approaching the node 12, as will be explained in more detail with reference to FIG. 3.

The term "information fusion" is to be understood as general methods by which data of different sensors, i.e. from one or more information sources 52, are associated with the target for gaining new and more precise knowledge on measuring or detection values (here the images contained in the sensor data 46) and events. The information fusion can include a sensor fusion, a data fusion, as well as a distributed detection and measurement. Basic principles of the information fusion have been known for a long time and will be described in more detail further below.

The information fusion is used for controlling the objects 36 at the node 12 with regard to material flow (e.g., redirecting, stopping, accelerating, aligning, etc.), associated features 40 of which, being individualizing in an object-specific or (unambiguous) manner, either are not detectable at all by the sensor 22 or are not sufficiently accurate. For example, the object 36-1 could be positioned on the roller conveyer 16 with exactly that side to which the bar code 42 allowing the certain identification is attached. In this case the camera 24 would not be able, however, to detect the bar code 42. In another case the resolution of the camera 24 cannot be sufficient for rendering the bar code 42 (which is nevertheless visible) applicable. The resolution of the sensor 22 depends, amongst other things, on the size of the field of vision 26. Preferably, the size of the field of vision 26 is selected very large for using as few sensors 22 as possible in the overall system 10. The field of vision 26 preferably is at least that huge that the inlet section 28 and both outlet sections 30-1 and 30-2 are included. However, it is also possible to select the field of vision 26 even larger so that, for example, several nodes 12 are detected simultaneously by the same sensor 22.

The one or more other information sources 52 are preferably implemented by the material-flow control 38, and/or a warehouse-management control 54 (cf. FIG. 2). In the example of FIG. 1 the material-flow control 38 (which is not shown) has information, for example, that the smaller second object 36-2 has been moved onto the roller conveyer 16 at a deposition point which is not shown and designated in more detail here (e.g., in the goods receipt 56 or at a workstation 58, cf. FIG. 2) temporally after the first object 36-1. Thus, (additional) information on a geometrical relative distance and on a sequence of the objects 36-1 and 36-2 possibly exists. Both objects 36-1 and 36-2 have been identified in the goods receipt 56 or at the workstation 58 in an unambiguous—and thus certain manner by having read, for example, a respective bar code 42 thereof (bar code 42 of the second object 36-2 is not visible in FIG. 1), for example, by means of a hand-held scanner which is not shown and designated in more detail here. The scanner could have been operated by a person who has deposited the objects 36-1 and 36-2 on the roller conveyer 16. However, alternatively, an additional camera 24 could have been used at the location of the goods receipt 56 or at the workstation 58 for unambiguously and certainly identifying the objects 36-1 and 36-2 there (e.g., because there both of the bar codes 42 were visible and resolvable). The temporal distance which has passed between the deposition of the first object 36-1 and the deposition of the second object 36-2 on the roller conveyer 16 represents another exemplary information on a feature 40 for the specific pair of objects 36-1/36-2 which can be used by the evaluation device 48 upon identifying the respective objects 36-1 and 36-2.

Further, in a material-flow computer 60 (cf. FIG. 2), and/or in superordinate controlling units such as a programmable logic controller (SPS) 62 of a conveying module which is not shown and designated in more detail here, the sequence can be recorded in which the objects 36-1 and 36-2 are transported downstream to the node 12.

The warehouse-management control 54 (cf. FIG. 2) is typically implemented by a warehouse-management computer (WMC) 64. The warehouse-management control 54 manages object-specific data, i.e. object data 66, applicable as the additional data 50. The object data 66 include the (object-specific and associated) features 40. The features 40 represent one or more of the following mentioned variables and parameters: weight, shape or outer contour, dimension, packaging (e.g., carton, plastic foil, etc.), color, pattern, and/or the manufacturer label 44. It is clear that additional feature types, variables, and parameters can be considered and that the above list is not conclusive.

Further information can be achieved, for example, from a storage location of one of the objects 36 within a warehouse 68 (cf. FIG. 2). The warehouse 68 represents a source/sink 70 of the material flow for the objects 36 within the storage and picking system 10 of FIG. 2. The warehouse-management software has recorded information on which of the objects 36 is stored in which storage location within the warehouse 68. If the warehouse-management control 54 retrieves, for example, one container from the warehouse 68 containing several objects 36 which correspond to the type of the first object 36-1, then it can be sufficient, for example, to track this container by means of the material-flow control 38 (tracking/tracing) while being transported through the storage and picking system 10 by means of a transport system 72 in order to allow certain identification at a later time. The roller conveyer 16 can be part of the transport system 72. The transport system 72 can further include storage and retrieval devices (SRD) 74, driverless transport systems (DTS) 76, and the like. The material flow 18 can be tracked by means of additional sensors 22 upstream and/or downstream relative to the node 12 of FIG. 1. These sensors 22 can be of the same type or of a different type. A different sensor type could be implemented, for example, by a scale for determining the weight of the respective object 36.

Order management 78 (cf. FIG. 2) represents an additional potential information source 52. From the corresponding data of the order management 78 information on the material flow 18 at the node 12 can also be achieved, i.e. extracted, as described exemplarily below. One specific order includes, for example, five objects 36 being reflected in one or more corresponding order lines. Four objects 36 of these five objects 36 have already been recognized at the node 12. Assuming further that the material flow 18 is conducted in an order-oriented manner, i.e. that the objects 36 for this specific order are transported always as a group, it can then be learned via the above-mentioned information fusion which object 36 it represented by the object which cannot be identified. It must be the fifth object 36 of this order.

The aim of the present invention, i.e. the manipulation of the material flow 18 at the node 12, is achieved preferably by only one single sensor technology, namely exemplarily by the (video) camera 24. The camera 24 replaces a plurality of sensors (e.g., light sensors, light barriers, etc.) which are typically used. Another advantage is to be seen in that, for example, stopping positions, discharging positions, redirecting positions, and the like can be detected and influenced independently of the sensor position due to the (large) field of vision, or field of view, 26 of the camera 24. Here one does not deal with controlling the material flow 18 by cameras 24 per se, but with the correction of a big disadvantage of the camera 24 which is to be seen in that the camera 24 either cannot see the object-identifying features 40 at all or cannot sufficiently resolve the same. This disadvantage is corrected by the information fusion wherein the different information sources 52 are combined and evaluated as well as combined for the solution of the specific problem.

As a result, a controlling decision (e.g., path decision, stop decision, etc.) can be taken for an object 36 which was not recognizable and identifiable in a conventional manner (merely by the camera 24). The technological requirements on the sensors (e.g., image resolution, image processing, and the like) decrease. Thereby, in general, cameras 24 can be used which are substantially cheaper and can be realized already by the technology of today.

It is clear that the technology described here cannot only be used at branching points 20 (cf. FIG. 1) but also at workstations 58 (e.g., picking-work stations) or in the goods receipt 56 or in the goods issue. The technology can even be used with accumulation lines, where the objects are stopped at predetermined points on the conveyer 14 (in terms of phases) for closing, for example, gaps between adjacent objects 36 or for generating gaps between adjacent objects 36. In this case the node 12 thus does not represent a branching point 20 but a decision point only (stopping or conveying?).

Another aspect of the described technology is to be seen in visualization. Both the entire storage and picking system 10 and merely parts thereof can be visualized. Disturbances (such as jam on the roller conveyer 16) can thus be visualized easily. In this case it is even possible to visualize the jammed objects 36 in an unambiguously identifiable manner. The material flow 18 generally includes information on transport processes and procedures as well as on storing and undesired stays of all objects 36 within the system 10. By means of a material-flow analysis weak points in the material flow 18 can be recognized and causes thereof can be researched. The graphical illustration (visualization) of the material flow 18 serves for emphasizing and illustrating relationships and procedures to allow indication and easier evaluation of specific data and weak points. The graphical illustration offers the advantage of a better clarity and ensures a faster reception of the essentials.

With another alternative the sensor 22 of FIG. 1 does not need to be mounted at a fixed location. The sensor 22 can be mounted, for example, on a movably supported arm to move the sensor 22 within a region of the system 10 which is of particular interest at a certain time. For example, the sensor 22 could also be mounted on a drone. In this case it would be possible to solve problems of material flow fast and flexible which have required the service of human beings at site so far.

In the following the information fusion will be considered closer again. For implementing the information fusion artificial intelligence, or a neuronal network, can be used in the evaluation device 48.

The above-mentioned data fusion is to be understood in the present case as merging and completing incomplete data sets. The data fusion is a component of an information integration. A "donor data set" (additional data 50) provides additional data for a "receiver data set" (sensor data 46). The donor data set consists of, for example, the variables (C, D) and the receiver data set consists of the variables (C, R). The common variable C thus is present in both data sets while the donor variable D and the receiver variable R are respectively present in one of the data sets only. Based on the donor data set a model for calculating the value D from the variable C is created. This model is applied on the receiver data set so that a new fused data set arises (C, R, D). In this context statistic methods can be used. With the data fusion several data sets, which are partially incomplete, can be combined.

Preferably, the features 40 are used as the variables. Before the fusion of data of two information sources 52 is possible, the data needs to be brought, if necessary, to a common scheme. Attributes, or variables, which are present can be filled by zero (indicating "no value"). As a rule, however, commonly identifying the attribute in terms of an identification is necessary. The merge operator allows, for example, the merging of crosswise incomplete data sets.

Further, it can happen that more than two data sets of different sensors (including the sensor 22) are merged with each other. This is called a sensor data fusion. With the sensor data fusion output data of several sensors or information sources 52 are associated in general. It is an aim to achieve information of a better quality. Better quality means that the objects 36 at the node 12 are identifiable certainly, and in particular can be classified better. In this manner reliability of the material-flow control 38 can be increased, as a rule, by the utilization of several ones of the information sources 52. With utilization of different sensor types the detection likelihood is also increased over all. This means that the objects 36 can also be recognized if individual sensors, which are different to the sensor 22, have a limited reception or are "blind" due to environmental conditions. For increasing the capability of identification, the measuring errors of the sensors should not correlate but satisfy certain likelihood-density functions (e.g., normal distribution) or should be identifiable and quantizable differently. Since visual regions (e.g., the field of vision 26) of the sensors are typically restricted the utilization of several sensors enlarges the visual region of the overall system correspondingly. An ambiguous identification can be resolved easier. Additional sensors often provide additional information and thus expand the knowledge of the overall system. The sensor data fusion can also lead to reduction of costs because, for example, several cheap sensors can replace one sensor which is particularly expensive.

Figure 3:
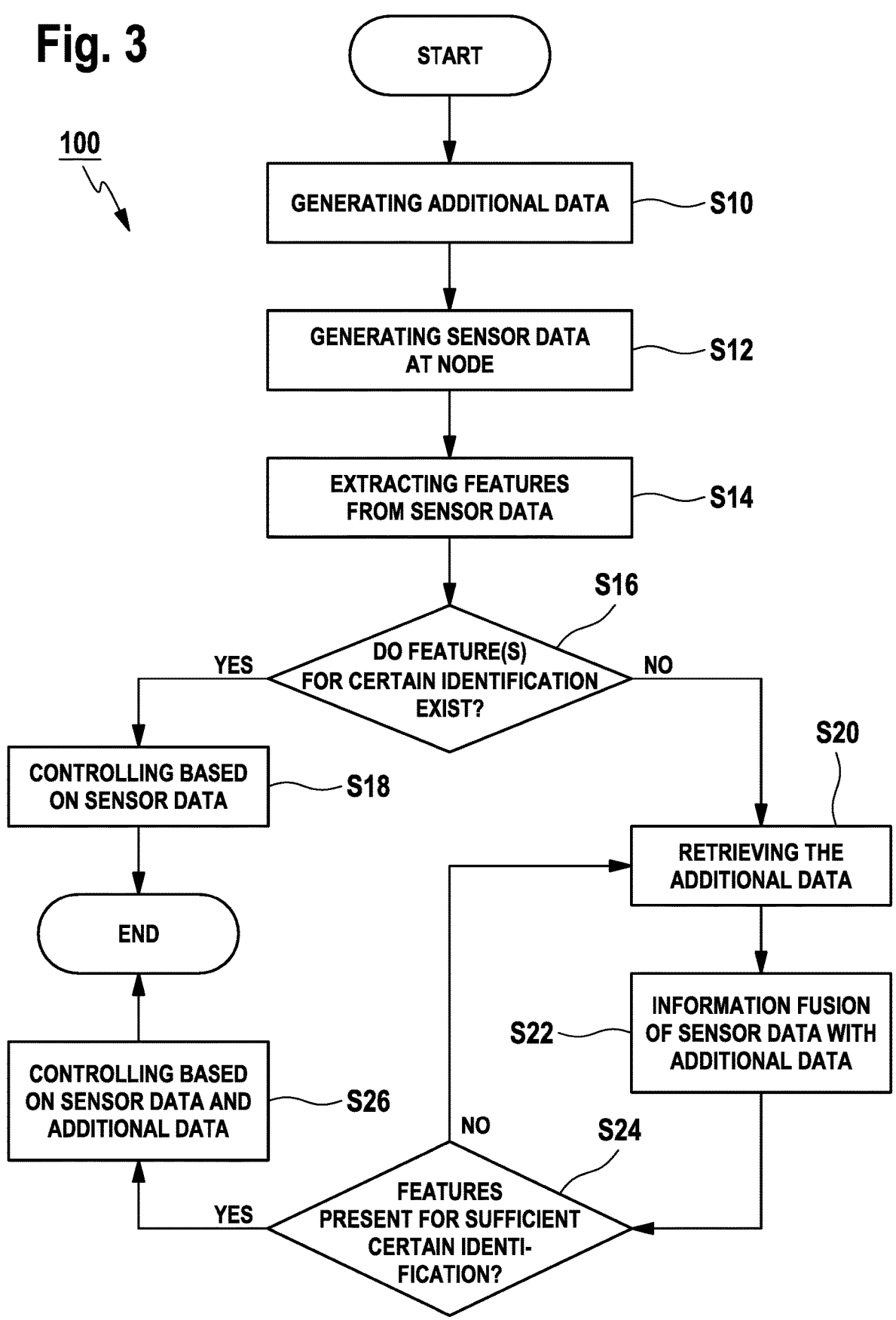
FIG. 3 shows a flow chart of a method for controlling a material flow.

With reference to FIG. 3 a flow chart of a method for controlling the material flow 18 in the storage and picking system 10 at the sensor-controlled node 12 of the material flow 18 will be described below, where a decision on a future material-flow direction and/or on a velocity of the material flow 18 is to be taken.

In step S10 the additional data 50 are generated (in advance). One or more (data) sets of additional data 50 are generated by one or more of the information sources 52 which are different from the sensor 22 of the node 12. The additional data 52 are temporarily pre-generated for allowing conducting the information fusion with the sensor data 46 later, as will be explained hereinafter in more detail. The step S10 is optional. It is clear that the additional data 50 do not need to be generated explicitly but can also be already present as data sets in the system 10.

In step S12 the sensor data 46 is generated at the node 12. The sensor data 46 is generated by the sensor 22 by detecting the objects 36 within the field of vision 26 of the sensor 22, which is particularly implemented by the (only) camera 24.

In step S14 the features 40 of the detected objects 36 are achieved, i.e. extracted, by the evaluation device 48 from the sensor data 46. Image recognition is preferably conducted with the extraction. The image recognition is a partial field of pattern recognition and image processing. With the pattern recognition regularities, repetitions, similarities, and/or regularities in the quantity of the sensor data 46 are recognized. In particular, the above-mentioned parameters (e.g., bar code 42, manufacturer label 44, dimensions, color patterns, packaging types, and the like) of the objects 36 are recognized which approach the node 12 in a downstream direction and enter the field of vision 26 of the sensor 22, and in particular the inlet section 28 of the node 12. A central point in this context is the recognizing of the patterns, i.e. in particular the features 40 which are common to each of the objects 36 of one category and which distinguish these objects 36 from the content of other categories.

With the image processing the sensor data 46 are processed which can be (single) images from video data of the camera 24. The result of the image processing can be a quantity of features 40 of the input image. In most of the cases the images are regarded in terms of a two-dimensional signal so that typical methods of signal processing can be applied. For example, the objects 36 can be measured. A position of the objects 36 relative to the roller conveyer 16 can be determined. A relative distance between adjacent objects 36 can be measured. The bar code 42 can be "measured" and thus recognized. Thus, by means of the image processing, coded information (bar code 42) can be read automatically from the images for identifying the objects 36.

In step S16 it is checked for example by means of a feature comparison—whether the extracted feature(s) 40 are present for the certain identification of the respectively detected objects 36. If these features 40 are present the material flow 18 is controlled, preferably exclusively, based on the sensor data 46 as shown in step S18. Otherwise, the additional data 50 is retrieved in step S20 which in turn comprise additional features 40.

Then, in step S22, the above-mentioned information fusion of the sensor data 46 with the additional data 50 is conducted. Subsequently it is checked in step S24 whether now features 40 for a sufficiently certain identification are present. If no sufficiently certain identification can be conducted yet then further additional data 50 is retrieved by returning to the step S20, and further additional data 50 from further information sources 52 is considered. Otherwise the material flow 18 is controlled based on a combination of the sensor data 46 and the additional data 50.

Then the method 100 ends.

Figure 4:
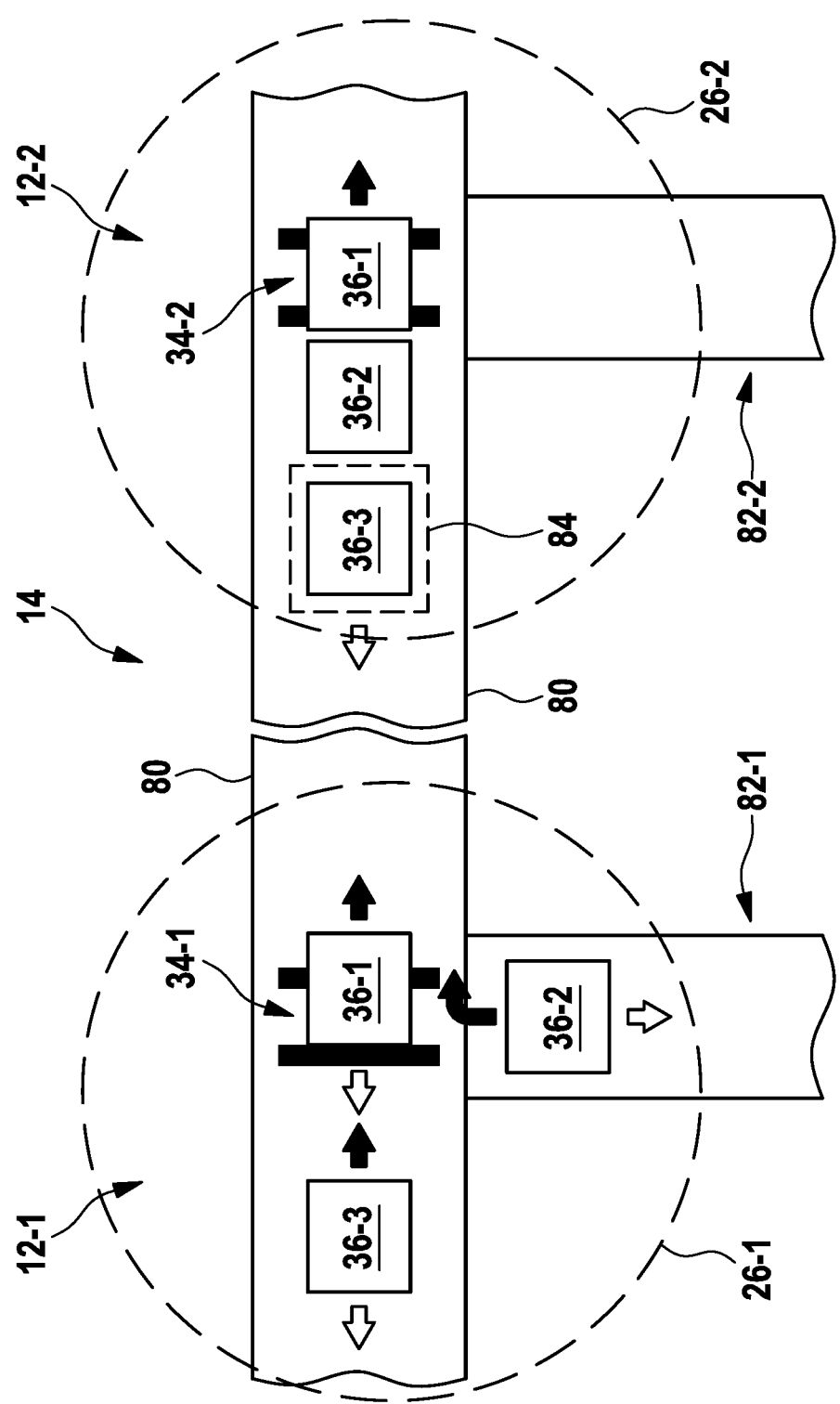
FIG. 4 shows a top view of two adjacent nodes for illustrating different conveying scenarios.

FIG. 4 shows a schematic top view of a portion of a conveyer 14 which is exemplarily formed by one primary line 80 and two secondary lines 82-1 and 82-2. The secondary lines 82 extend perpendicular to the primary line 80 and can be used as feeding conveyers and/or discharging conveyers. The sections where the primary line 80 is connected to the secondary lines 82 represent the nodes 12-1 and 12-2. Each of the nodes 12-1 and 12-2 is monitored by a camera 24 which is not shown in more detail. In FIG. 4 the corresponding fields of vision 26-1 and 26-2 are indicated (exemplarily) by circular dashed lines. The fields of vision 26-1 and 26-2 are selected in size such that respectively the above-mentioned sections 28-32 of the nodes 12-1 and 12-2 are detected which are here also not shown in more detail. In the junction section 32 of the left node 12-1, for example, a lifting device 34-1 of the above-described type is provided. The section of the right node 12-2 exemplarily comprises a scale 84 which is indicated by a rectangular of dashed lines in terms of an additional sensor 22 besides the camera 24. Further, an additional lifting device 34-2 is provided.

Exemplarily two different scenarios are illustrated in FIG. 4 in terms of dark and light arrows. In a first scenario the dark arrows are considered. The objects 36-1 to 36-3 are transported from left to right, wherein the node 12-1 is shown at a first time and the node 12-2 is shown at a later second time. In the second scenario the light arrows are considered wherein the objects 36 are transported from right to left, and the node 12-2 shows a momentary view which is earlier than the momentary view at the node 12-1. In both scenarios respectively several information sources, or sensor sources, are used for achieving an identification of the conveying goods. These conveying goods are synchronized with the image-processing information of the cameras 24 for controlling, amongst other things, the motors and, if necessary, other actuators at the respective nodes 12-1 and 12-2. This means that, via the camera(s) and the thereby achieved temporal synchronization between the objects 36 and the locations, also synchronization of the sensor data is achieved.

LIST OF REFERENCE NUMERALS

10 Storage and picking system
12 Node
14 Conveyer
16 Roller conveyer
18 Material flow
20 Branching point
22 Sensor
24 Camera
26 Field of vision
28 Inlet section
30 Outlet section
32 Junction section
34 Lifting device
36 (Material-flow) object
38 Material-flow control
40 Feature
42 Bar code
44 Manufacturer label
46 Sensor data
48 Evaluation device
50 Additional data
52 Information source
54 Warehouse-management control
56 Goods receipt
58 Workstation
60 Material-flow computer
62 SPS
64 WMC
66 Object data/object-specific data
68 Warehouse
70 Source/sink
72 Transport system
74 SRD
76 DTS
78 Order management
80 Primary line
82 Secondary line
84 Scale

The invention claimed is:

1. A method for controlling a material flow at a sensor-controlled node in a storage and picking system, wherein the material flow moves in a downstream direction and divides into at least two directions at the sensor-controlled node, and wherein the sensor-controlled node is configured to control a future direction and/or velocity of the material flow in the downstream direction, the method comprising the steps of:
providing a single sensor in the form of a camera having a detection field that is used to detect at least one inlet section of the node;
generating sensor data with the sensor, wherein the sensor data represents the material flow in terms of one or more material-flow objects located in the detection field of the sensor and which approach the inlet section of node in the downstream direction;

checking whether the sensor data includes at least one associated object feature allowing certain identification for each of the one or more approaching material-flow objects; and, (i) when the sensor data includes the at least one associated object feature allowing the certain identification for each of the one or more approaching material-flow objects, controlling the material flow at the node based on the sensor data; or, (ii) when the sensor data does not include the at least one associated object feature allowing the certain identification for each of the one or more approaching material-flow objects, controlling the material flow at the node based on an information fusion of the sensor data with pre-generated additional data, wherein the pre-generated additional data originates from a material flow control (MFC) and includes object tracking data that is used to track each of the one or more approaching material-flow objects at locations in the downstream direction, wherein the information fusion of the sensor data with the pre-generated additional data including the object tracking data from the MFC enables the sensor-controlled node to control the material flow with a sufficiently certain identification for each of the one or more approaching material-flow objects.

2. The method of claim 1, wherein the at least one associated object feature is optically recognizable and includes a bar code, an individualizing color combination, an individualizing manufacturer label, an individualizing contour, and/or an individualizing dimension or size.

3. The method of claim 1, wherein the detection field of the camera is such that visible bar codes are not resolvable.

4. The method of claim 1, wherein the pre-generated additional data may further originate from a warehouse-management control, a workstation, and/or a goods receipt.

5. The method of claim 1, wherein the object tracking data that is used to track each of the approaching material-flow objects includes at least one of the following parameters:
   a sequence, in which the material-flow objects approach the node;
   a relative distance of subsequent material-flow objects; and
   a time when a respective material-flow object has been added to the material flow;
   a deposition location where the respective material-flow object has been added to the material flow;
   a path which has been taken by the respective material-flow object through the system so far;
   a location-dependent velocity at which the respective material-flow object is moved through the system.

6. The method of claim 1, wherein controlling the material flow includes a sensor-data synchronized actuating of an actuator at the node, wherein the actuator is configured to change the direction and/or velocity of the material-flow object.

7. The method of claim 1, wherein the checking includes:
   recognizing each of the approaching material-flow objects from the sensor data;
   extracting the at least one associated object features for each of the recognized material-flow objects; and,
   using the recognized material-flow objects to determine whether the extracted associated features allow the certain identification.

8. The method of claim 1, wherein the information fusion includes data fusion of the sensor data with the additional data by merging and completing a corresponding incomplete sensor data set that does not include the associated feature required for the certain identification, with an additional data set, wherein the additional data set includes a variable that is one of the features being present in both the sensor data set and also in the additional-data set, thereby producing a merged and completed sensor data set.

9. The method of claim 8, further comprising the step of:
   checking whether the merged and completed sensor data set includes one of the features which includes the sufficiently certain identification.

10. The method of claim 1, wherein the step of the controlling the material flow at the node includes a synchronized controlling of at least one actuator provided within the region of the node.

11. A device for controlling a material flow at a sensor-controlled node in a storage and picking system, wherein the material flow moves in a downstream direction and divides into at least two directions at the sensor-controlled node, and wherein the sensor controlled node is configured to control a future direction and/or velocity of the material flow in the downstream direction, the device comprising:
   a single sensor in the form of a camera having a detection field that is used to detect at least one inlet section of the node, wherein the sensor generates sensor data, and wherein the sensor data represents the material flow in terms of one or more material-flow objects located in the detection field of the sensor and which approach the inlet section of the node in the downstream direction;
   an evaluation device being configured to:
   check whether the sensor data includes at least one associated object feature allowing certain identification for each of the one or more approaching material-flow objects; and,
      (i) when if the sensor data includes the at least one associated object feature allowing the certain identification for each of the one or more approaching material-flow objects, control the material flow at the node based on the sensor data; or,
      (ii) when the sensor data does not include the at least one associated object feature allowing the certain identification for each of the one or more approaching material-flow objects, control the material flow at the node based on an information fusion of the sensor data with pre-generated additional data, wherein the pre-generated additional data originates from a material flow control (MFC) and includes object tracking data that is used to track each of the one or more approaching material-flow objects at locations in the downstream direction, wherein the information fusion of the sensor data with the pregenerated additional data including the object tracking data from the MFC enables the sensor-controlled node to control the material flow with a sufficiently certain identification for each of the one or more approaching material-flow objects.

\* \* \* \* \*